United States Patent
Eitan et al.

(10) Patent No.: US 8,699,641 B2
(45) Date of Patent: Apr. 15, 2014

(54) METHOD AND APPARATUS FOR ATSC SIGNAL PROCESSING

(75) Inventors: Alecsander P. Eitan, Haifa (IL); Ori Shental, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 12/813,257

(22) Filed: Jun. 10, 2010

(65) Prior Publication Data

US 2011/0304776 A1  Dec. 15, 2011

(51) Int. Cl.
*H04B 1/10* (2006.01)

(52) U.S. Cl.
USPC .......................................................... 375/346

(58) Field of Classification Search
USPC ........ 342/357.29, 378; 348/43, 726; 370/310, 370/349, 390; 375/240.01, 240.02, 240.24, 375/240.26, 321, 355; 725/32, 51; 714/756
See application file for complete search history.

(56) References Cited

U.S. PATENT DOCUMENTS

| | | | |
|---|---|---|---|
| 8,149,744 B2* | 4/2012 | Song et al. ................... 370/310 |
| 2003/0201932 A1* | 10/2003 | Rabinowitz et al. ...... 342/357.09 |
| 2004/0109670 A1* | 6/2004 | Kim et al. ..................... 386/46 |
| 2008/0008280 A1* | 1/2008 | Zhu et al. ..................... 375/355 |
| 2009/0067548 A1* | 3/2009 | Song et al. ................... 375/321 |
| 2009/0288121 A1 | 11/2009 | Shelby et al. |
| 2010/0064323 A1* | 3/2010 | Song et al. ................... 725/51 |
| 2010/0135375 A1* | 6/2010 | Lee et al. ..................... 375/231 |
| 2010/0141738 A1* | 6/2010 | Lee et al. ..................... 348/43 |
| 2010/0226443 A1* | 9/2010 | Citta et al. ............... 375/240.26 |
| 2010/0232495 A1* | 9/2010 | Citta et al. ............... 375/240.01 |

(Continued)

FOREIGN PATENT DOCUMENTS

WO  WO 2009002457 A1  12/2008

OTHER PUBLICATIONS

ATSC: "ATSC Digital Television Standard Part 2 — RF/Transmission System Characteristics (A/53, Part 2:2007)" Jan. 3, 2007 (Jan. 3, 2007), Advanced Television Systems Committee, Washington, D.C. 20006, pp. 1-44.

(Continued)

*Primary Examiner* — Chieh M Fan
*Assistant Examiner* — Bahman Badipour
(74) *Attorney, Agent, or Firm* — Arent Fox LLP

(57) ABSTRACT

Embodiment methods and apparatus enable ATSC receiver devices to receive and process ATSC-M/H training sequences in order to improve the reception and decoding of an ATSC service. A processor within the ATSC receiver device may be configured to receive training sequences 1 and 2 of the ATSC-M/H signal. In an embodiment, the ATSC-M/H training sequence 2 may be received by correlating symbols of the two halves of the training sequence 2. If the result of correlating the symbols is greater than or equal to a threshold, the ATSC-M/H training sequence 2 may be received by the ATSC receiver and a counter for the training sequence 1 may start. The ATSC receiver may correlate two consecutive training sequences 1 to perform fine residual frequency error estimation.

20 Claims, 7 Drawing Sheets

(56) References Cited

U.S. PATENT DOCUMENTS

| | | |
|---|---|---|
| 2010/0238916 A1* | 9/2010 | Zurek-Terhardt et al. .... 370/349 |
| 2010/0238995 A1* | 9/2010 | Citta et al. ............... 375/240.01 |
| 2010/0246663 A1* | 9/2010 | Citta et al. ............... 375/240.01 |
| 2010/0246664 A1* | 9/2010 | Citta et al. ............... 375/240.01 |
| 2010/0254489 A1* | 10/2010 | Citta ............................. 375/299 |
| 2010/0296576 A1* | 11/2010 | Citta et al. ............... 375/240.02 |
| 2010/0299699 A1* | 11/2010 | Citta et al. ...................... 725/32 |
| 2011/0025561 A1* | 2/2011 | Opshaug et al. ............... 342/378 |
| 2011/0026601 A1* | 2/2011 | Mueller et al. ........... 375/240.24 |
| 2011/0093759 A1* | 4/2011 | Song et al. .................... 714/756 |
| 2012/0063455 A1* | 3/2012 | Song et al. .................... 370/390 |

OTHER PUBLICATIONS

International Search Report and Written Opinion—PCT/US2011/037608, International Search Authority—European Patent Office—Aug. 17, 2011.

Xia, Jingsong "A Carrier Recovery Approach for ATSC Receivers", IEEE Transactions On Broadcasting, IEEE Service Center, Piscataway, NJ, US, vol. 54, no. 1, Mar. 1, 2008 (Mar. 1, 2008), pp. 131-139, XP011203138.

* cited by examiner

METHOD AND APPARATUS FOR ATSC SIGNAL PROCESSING

TECHNICAL FIELD

The present application relates to wireless communication technologies, and more particularly to methods and devices for receiving ATSC wireless signals by utilizing ATSC-M/H training symbols.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. One format for broadcasting digital television signals is defined by the Advanced Television Systems Committee for digital television transmission in a standard typically referred to as "ATSC." The ATSC broadcast format is used for broadcasting digital television signals to fixed television receivers (e.g., home television sets). More recently, the Advanced Television Systems Committee has defined a new standard for broadcasting digital television that is suitable for reception by mobile and handheld television receivers, which is referred to as the "ATSC-M/H" standard.

SUMMARY

In an embodiment, a method for improving signal demodulation in an ATSC receiver device includes receiving a multiplexed ATSC signal including an ATSC service and at least one ATSC-M/H slot, obtaining an ATSC-M/H training sequence from the received multiplexed ATSC signal, and processing the ATSC service using the obtained ATSC-M/H training sequences. In alternative embodiments, the received ATSC-M/H training sequences may be used to estimate residual frequency error, as training symbols for a decision-feedback equalizer, to perform fine residual frequency error estimation, and to lock on to the ATSC signal.

In another embodiment, an ATSC receiver device includes a processor and a receiver circuit coupled to the processor, in which the processor is configured with processor-executable instructions to perform operations including receiving a multiplexed ATSC signal including an ATSC service and at least one ATSC-M/H slot, obtaining an ATSC-M/H training sequence from the received multiplexed ATSC signal, and processing the ATSC service using the obtained ATSC-M/H training sequences. In alternative embodiments, the receiver device processor may be configured such that received ATSC-M/H training sequences may be used to estimate residual frequency error, as training symbols for a decision-feedback equalizer, to perform fine residual frequency error estimation, and to lock on to the ATSC signal.

In another embodiment, an ATSC receiver device includes means for receiving a multiplexed ATSC signal including an ATSC service and at least one ATSC-M/H slot, means for obtaining an ATSC-M/H training sequence from the received multiplexed ATSC signal, and means for processing the ATSC service using the obtained ATSC-M/H training sequences. In alternative embodiments, the means for processing the ATSC service using the obtained ATSC-M/H training sequences may include means for using the received ATSC-M/H training sequences to estimate residual frequency error, as training symbols for a decision-feedback equalizer, to perform fine residual frequency error estimation, and to lock on to the ATSC signal.

In another embodiment, a non-transitory processor-readable storage medium may have stored thereon processor-executable instructions configured to cause a processor of an ATSC receiver device to perform operations including receiving a multiplexed ATSC signal including an ATSC service and at least one ATSC-M/H slot, obtaining an ATSC-M/H training sequence from the received multiplexed ATSC signal, and processing the ATSC service using the obtained ATSC-M/H training sequences. In alternative embodiments, the stored processor-executable instructions may be configured such that the received ATSC-M/H training sequences may be used to estimate residual frequency error, as training symbols for a decision-feedback equalizer, to perform fine residual frequency error estimation, and lock on to the ATSC signal.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
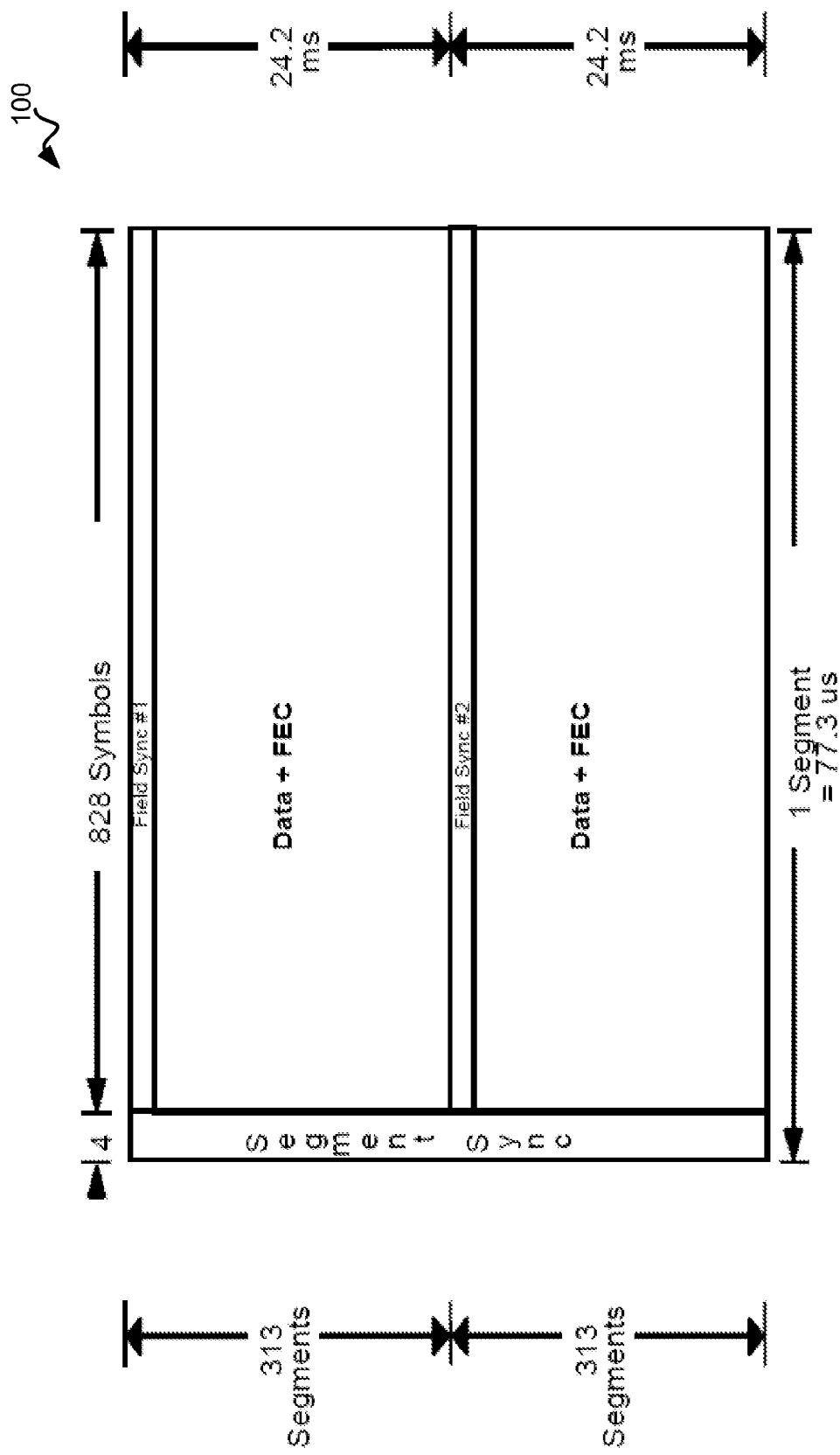
FIG. 1 illustrates a VSB data frame structure of an ATSC broadcast transmission.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The word "broadcast" is used herein to mean the transmission of data (information packets) so that it can be received by a large number of receiving devices simultaneously.

The term "receiver device" is used herein to refer generally to any digital television receiver configured to receive wireless broadcasts.

The ATSC standard has been widely adopted for the broadcast of digital television and many ATSC-compliant digital television receivers are in use today. The high definition television standards defined by the ATSC produce wide screen 16:9 images up to 1920×1080 pixels in size—more than six times the display resolution of the earlier standard. However, many different image sizes are also supported. The ATSC standard encodes information in the radio frequency signal using vestigial sideband modulation (VSB). While the ATSC signal effectively conveys the information required to deliver high-definition television programming, the complex waveform can be difficult to receive, particularly at the edges of the broadcast coverage area. Part of the reason for this difficulty is due to the relative scarcity of training symbols, which enable receiver devices to synchronize their decoding processes with the incoming received wireless signal. Because there are relatively few training symbols, receiver devices can fall out of sync with the broadcast signal, resulting in lost frames and degraded performance.

Recently, the Advanced Television Systems Committee has developed a new and separate broadcast standard for broadcasting television signals to mobile and handheld receivers known as the "ATSC Mobile/Handheld" or "ATSC-M/H" standard. A new standard was needed for mobile television systems because the movement of receiver devices can lead to interference and changes in the received signal timing that render the ATSC standard unreliable. For example, the movement of receiver devices can lead to transient fading as the device moves through ever-changing multipath configurations which can make it difficult for the device to properly decode the broadcast signal. Also, the movement of receiver devices results in changes in the received signal timing as the signal path length (and thus the time of flight of broadcast signals) changes. The ATSC-M/H standard is based on the ATSC standard, but several more training symbols are added per second to make it easier for mobile receiver devices to obtain and remain synchronized with broadcast transmissions.

The ATSC-M/H standard was developed to ensure backward compatibility with ATSC receiver devices and ATSC broadcast networks. Thus, the ATSC-M/H signals are added to the ATSC service, which is also referred to as the "main service." The ATSC and ATSC-M/H services are multiplexed in time to generate a single multiplexed broadcast signal. Thus, the ATSC-M/H transmission shares the same RF channel as the standard ATSC service. The sharing of the broadcast signal is accomplished by allocating a portion of the total available ~19.4 Mbps signal bandwidth to ATSC-M/H and utilizing delivery over IP transport. However, ATSC receiver devices do not receive the ATSC-M/H service, and ATSC-M/H receiver devices do not receive the ATSC service.

The various embodiments enable ATSC-compliant digital television receivers to utilize the extra training symbols included within the ATSC-M/H broadcast signal in order to remain synchronized with the conventional ATSC broadcast signal. Thus, while embodiment receiver devices process ATSC-M/H training symbols, the timing information provided by those symbols is not used to receive ATSC-M/H broadcast signals, but instead to more efficiently receive ATSC broadcast signals.

FIG. 1 illustrates the VSB data frame structure 100 for transmitting ATSC signals defined in the ATSC standard. VSB is the radio frequency (RF) modulation format utilized by ATSC digital television broadcasters to transmit the digital information that makes up a digital television broadcast. In ATSC transmissions, predefined, and thus recognizable, data patterns appear every 313 segments in what is known as a "Field Sync" which includes 828 Symbols, and in every segment in a "Frame Sync" (which is also referred to as a Segment Sync) which includes 4 Symbols. These recognizable data patterns are referred to herein as "training symbols" and are also known as "sync signals." Except for the last 12 bits in the Field Sync, the Field Sync and Frame Sync sequences are modulated with two levels and can therefore be decoded reliably even if they are not fully known a priori to the receiver device. Thus, an ATSC receiver device encounters a Field Sync every 24.2 milliseconds.

Figure 2:
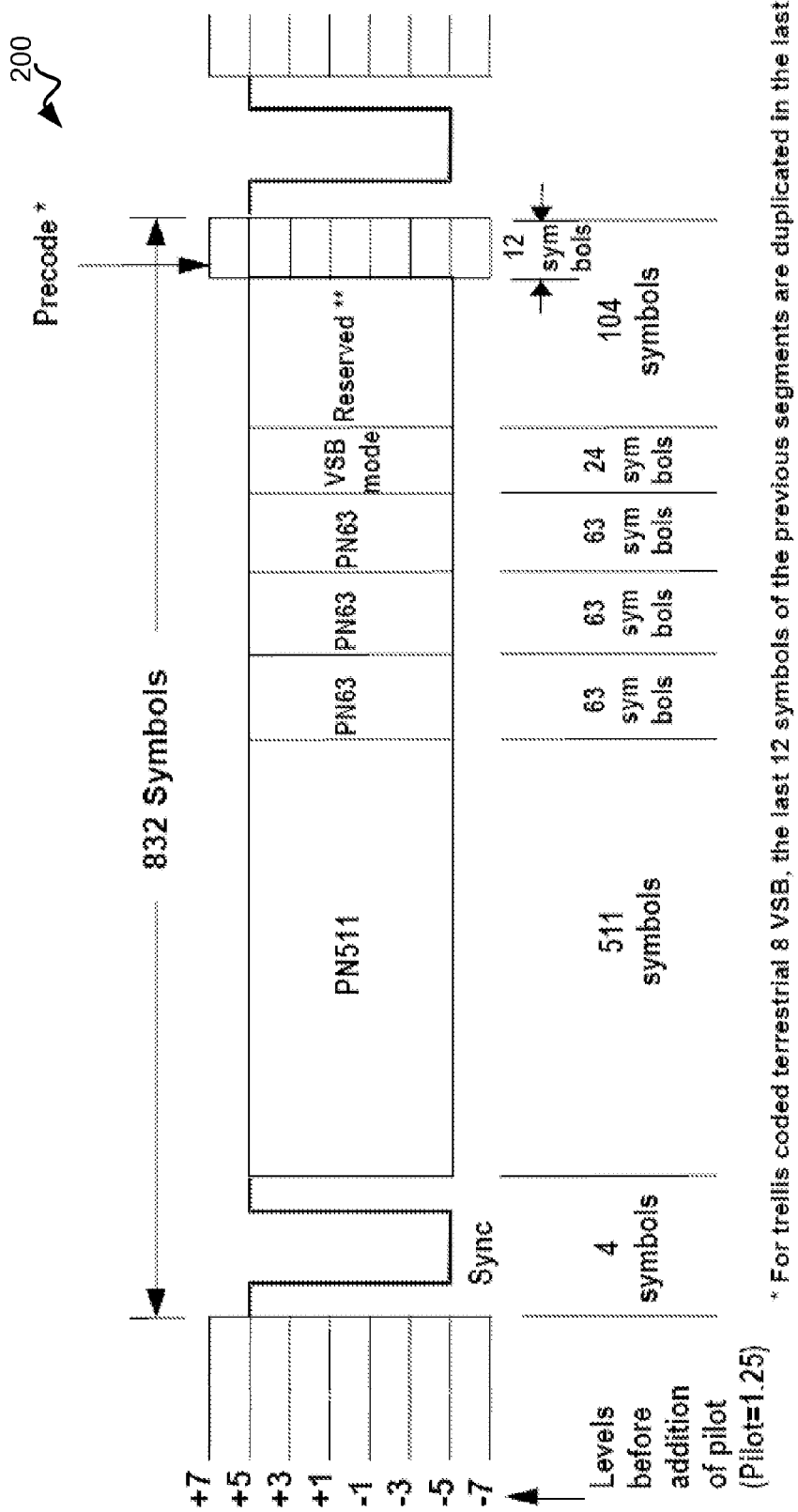
FIG. 2 illustrates a Field Sync structure of an ATSC broadcast transmission.

FIG. 2 illustrates a Field Sync sequence structure 200 according to the ATSC standard. In ATSC, 511+4 symbols are known a priori to the receiver device. Therefore 511 symbols of the sequence of symbols referred to in the figure as "PN511" can be easily used to estimate the Channel State Information (CSI), which is also known as the Channel Impulse Response (CIR). The remainder of the 828 symbols may then be inferred. In wireless communications, CSI refers to known channel properties of a communication link. This information describes how a signal propagates from the transmitter to the receiver, and represents the combined effect of different occurrences, such as scattering, fading, and power decay with distance. Calculation of the CSI enables receiver devices to adapt the signal reception and decoding to current channel conditions, which is crucial for achieving reliable communication with high data rates.

The performance of an ATSC receiver device is limited by the sparsity of the training sequences in the conventional ATSC signal format. The percentage of known or reliable symbols for training in the ATSC system may be calculated by using the formula 816/313/832+4/832 which results in a known/reliable percentage of less than 0.794%. The known/reliable symbol percentage and the relatively long duration of 24.2 milliseconds between training symbols may cause undesirable channel effects that may affect the quality of the received signal and thus the displayed television images.

ATSC receiver devices employ various methods to combat undesirable channel effects when demodulating received ATSC signals, including detecting signal presence, estimating the channel impulse response, performing frequency error measurements and corrections, performing frequency error tracking, tracking timing, timing the receiver, training the equalizer, estimating signal-to-noise ratio ("SNR"), performing estimation of jammers, and dynamically tracking all the above-mentioned functions. Although all ATSC receiver devices perform these functions using various algorithms, all calculations are based on using the known data derived from the Field Sync and Frame Sync training sequences defined in the ATSC signal.

As discussed above, the ATSC-M/H transmission includes additional embedded training symbols that are essential for reliable reception in mobile environments where there may be rapid changes in fading characteristics and Doppler frequency shifts. Central to the ATSC-M/H are additions to the physical layer of the ATSC transmission system that make it decodable under high Doppler shift conditions. Additional training sequences and additional forward error correction assist reception of the enhanced streams. These sequences facilitate fast detection and tracking even in fast mobile environments.

According to the ATSC-M/H standard, each ATSC-M/H transmission system inserts long and regularly spaced training sequences into each ATSC-M/H group. An ATSC-M/H group is a collection of 118 consecutive M/H Encapsulations (encapsulated transport packets delivering M/H service data) and the corresponding data symbols in the 8-VSB signal after interleaving and trellis coding at the MPEG-2 transport stream level. The length of the training sequences provides fast acquisition of the channel during bursted power-saving operation of the demodulator.

Each ATSC-M/H group contains 6 training sequences of two types. Training Sequence #1 ("TR1") is transmitted 5 times in each M/H slot. Its length is 1424 symbols. Training Sequence #2 ("TR2") is transmitted once in each M/H slot. Its length is 2×528 symbols. The training sequences are inserted prior to trellis encoding of the signal by the modified trellis encoders. These trellis encoded sequences are known sequences because the trellis encoder memories are initialized to predetermined values at the beginning of each sequence.

After trellis encoding, the last 1416 (=588+828) symbols of the first training sequence, the third training sequence, the fourth training sequence, the fifth training sequence and the sixth training sequence can have the same data pattern in common. The total length of each common training pattern is 1424 symbols, including the data segment sync symbols in the middle of and after each sequence. The second training sequence has a first 528-symbol sequence and a second 528-symbol sequence that have the same data pattern. The 528-symbol sequence is repeated after the 4-symbol data segment sync signal.

The first training sequence is located at the last two segments of the ATSC-M/H block. An ATSC-M/H block is defined as a series of contiguously transmitted VSB data segments within an ATSC-M/H group, containing ATSC-M/H data or a combination of main (legacy) and ATSC-M/H data. The second training sequence can be inserted at the second and third segments of the M/H block. The third training sequence, the fourth training sequence, the fifth training sequence and the sixth training sequence can be placed at the last two segments of the ATSC-M/H blocks, respectively.

Figure 3:
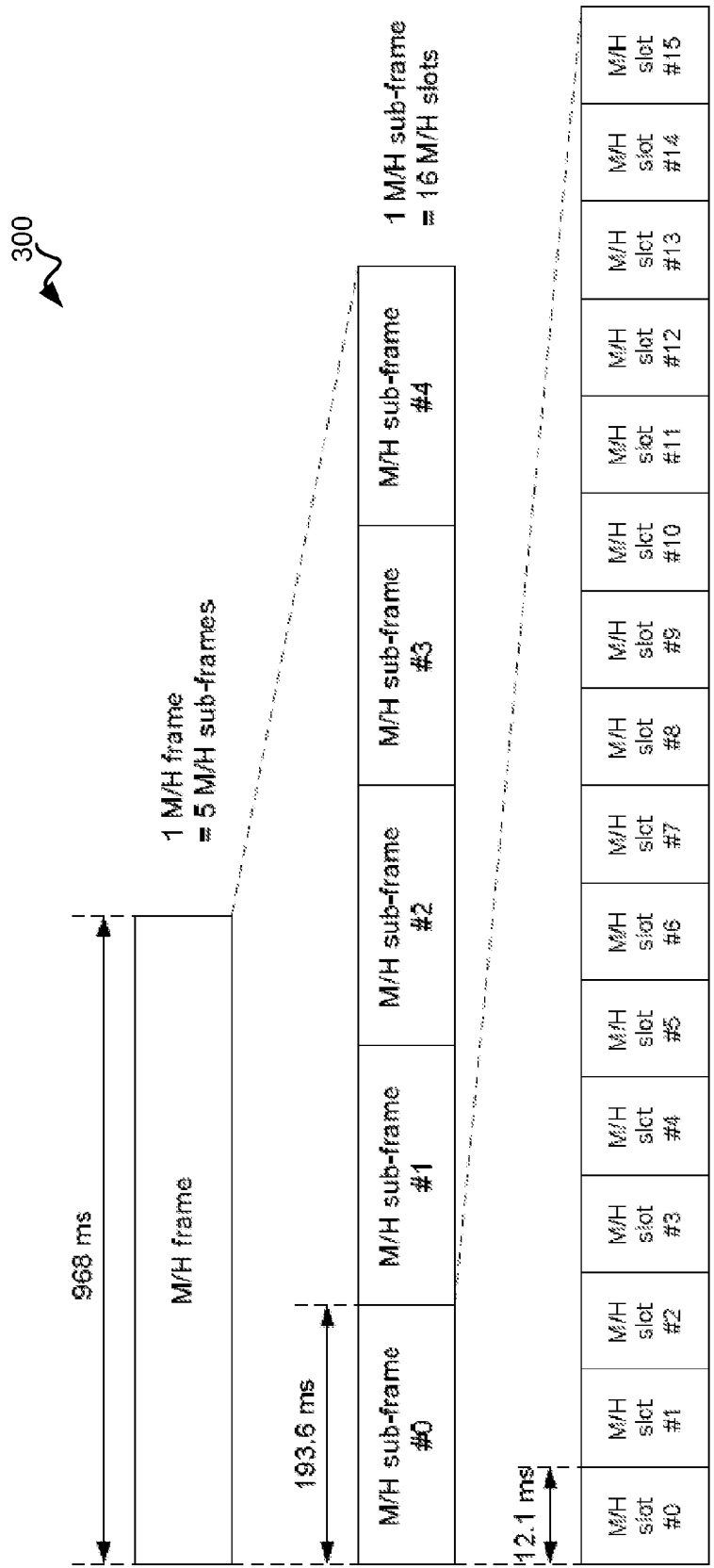
FIG. 3 illustrates a broadcast frame structure of an ATSC-M/H broadcast transmission.

FIG. 3 illustrates the data structure utilized in ATSC-M/H in superframes 300, which are referred to as "frames" in the ATSC-M/H specification and as "M/H frame" herein. The M/H frame is a basic time period that carries one or more "M/H parades." An M/H parade is a collection of M/H groups that have the same M/H forward error correction (FEC) parameters. An M/H parade is contained within one M/H frame. Each M/H parade carries one or two "M/H ensembles." Each parade is derived from either one or two Reed-Solomon frames. One M/H frame carries main data and M/H data, which is encapsulated in M/H encapsulation (MHE) packets, which are approximately equivalent in size to 20 VSB data frames. However, the boundaries of the M/H frame are offset from VSB frame boundaries, as explained below. The M/H frame consists of five consecutive sub-frames, respectively numbered "0, 1, 2, 3, and 4." Thus, each sub-frame contains the same amount of data as 4 VSB data frames (8 VSB data fields). Each sub-frame consists of sixteen consecutive "M/H slots," respectively numbered "0, 1, 2 . . . 15". Each M/H slot consists of 156 transport stream (TS) packets or equivalently 156 data segments (at the symbol level), or equivalently one half of a VSB data field. When packets from a given M/H slot are processed into interleaved data segments, the symbols from that slot are distributed throughout more than 156 data segments. The duration of an M/H slot is approximately 12.1 ms, and the duration of an M/H sub-frame is approximately 193.6 ms. The duration of an M/H frame may be the same as 20 VSB data frames (i.e., approximately 968 ms), and the M/H frame boundaries may be offset from VSB data frame boundaries.

The M/H slot is the basic time period for multiplexing of M/H data and main service data. After M/H pre-processing, M/H data is formatted as a group of 118 consecutive MHE packets which encapsulate the M/H service data. A particular slot may contain M/H data, or may consist of only main service data. If an M/H group is transmitted during an M/H slot, then the first 118 transport stream packets in the slot are an M/H group, and the remaining 38 packets are main transport service packets. If there is no M/H group in an M/H slot, the M/H slot consists of 156 main transport stream packets.

As required in *A/53: ATSC Digital Television Standard Part 2* (2007), each VSB data frame consists of two VSB data fields, each containing 313 data segments. The first data segment of each VSB data field is a unique synchronizing signal (Field Sync) and includes the training sequence used by non-M/H as well as M/H receivers. The remaining 312 data segments each carry the equivalent of the data from one 188-byte transport stream packet and its associated FEC overhead. The start of the M/H slot can be offset in its position relative to the start of a VSB data frame.

Each M/H frame is composed of five M/H sub-frames. Each sub-frame is composed of 16 slots. A slot consists of 156 transport stream packets (before byte interleaving). A slot may consist of only legacy transport stream packets, or may be assigned to carry a group of 118 M/H-carrying MHE packets and 38 legacy transport stream packets. Once the assignment is made, the M/H data is transmitted in time order of available slots. There are also defined rules for the placement of groups belonging to single or multiple ensembles.

For example, the number of groups allotted per M/H frame is a multiple of 5, and the group allotment and assignment is identical for all M/H sub-frames in an M/H frame. An M/H parade is a collection of M/H groups, contained within one M/H frame. The portion of a parade within a sub-frame consists of a collection of consecutively numbered groups. The structure of a parade in terms of its constituent group numbers and slot numbers within a sub-frame is replicated in all sub-frames of an M/H frame (although the data contents of the groups differ among the sub-frames).

The starting group number for the first parade to which group numbers are assigned is zero. The starting group number of a succeeding parade is the next higher group number after the group numbers for all preceding parades have been assigned. An M/H parade carries data from one or two particular Reed-Solomon frames depending on a Reed-Solomon frame mode. The Reed-Solomon frame is a packet-level FEC structure for the M/H data. Each Reed-Solomon frame carries, and FEC encodes, an M/H ensemble, which is a collection of M/H services providing the same quality of service.

Figure 4:
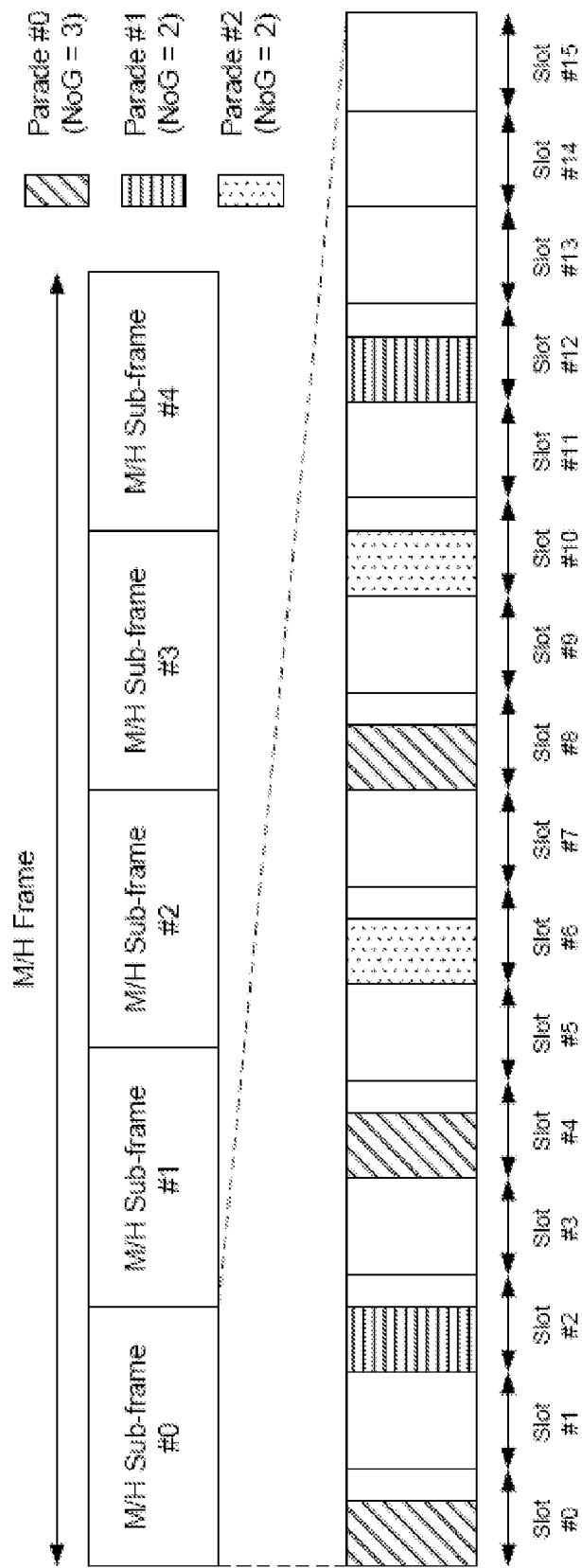
FIG. 4 illustrates assignments of multiple broadcast parades to sub-frames within a frame of an ATSC-M/H broadcast transmission.

Multiple M/H parades can be transmitted with main service data within an M/H frame. The example in FIG. 4 shows three M/H parades in an M/H frame. The first parade has three groups per M/H sub-frame and its group positions are determined by a simple formula. The second parade has two groups per M/H sub-frame and its allocated slot numbers are determined by changing the group number i from "3" to "4" in the formula. In a similar manner, the group positions of the third parade are obtained by changing the group number i from "5" to "6" in the formula. The M/H frame organization can be changed M/H frame by M/H frame. This allows adjustment of ensemble data rates on a frequent and flexible basis. The number of groups per M/H sub-frame (NoG) for an M/H parade ranges from 1 to 8, and therefore the number of groups per M/H frame for a parade ranges from 5 to 40, with a step of 5.

Figure 5:
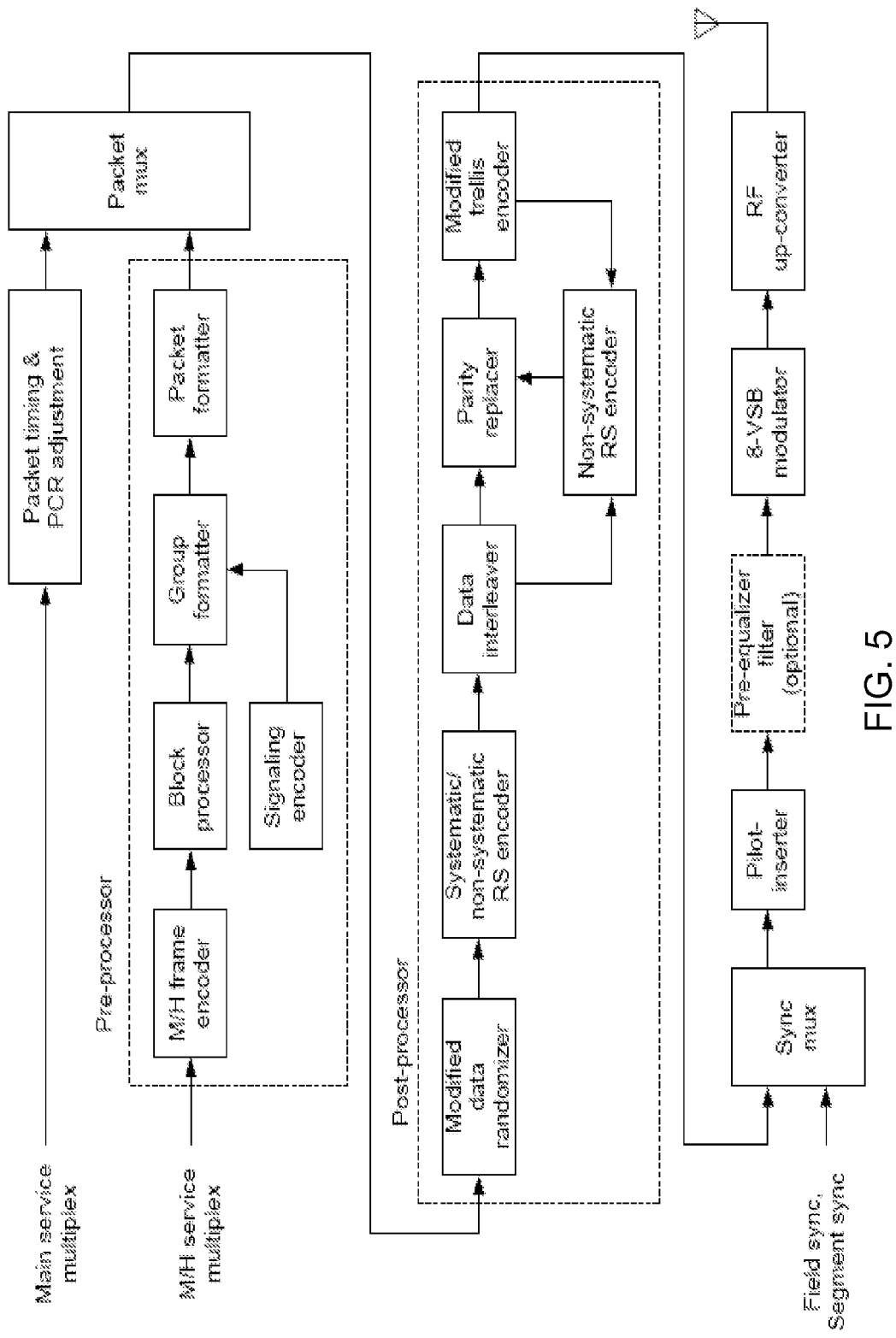
FIG. 5 is a process component block diagram of a typical ATSC-M/H broadcast transmitter system.

FIG. 5 is a functional block diagram of an ATSC-M/H transmission system. The M/H transmission system receives two sets of input streams; one consists of the MPEG transport stream (TS) packets of the main service data, and the other consists of the M/H service data. At a high level, the function of the M/H transmission system is to combine these two types of streams into one stream of MPEG transport stream packets and process and modulate them into the normal ATSC trellis-coded 8-VSB signal.

The M/H frame encoder encodes ensembles into primary and secondary Reed-Solomon frames, randomizes the M/H data for spectral performance and adds two-dimensional Reed-Solomon CRC encoding. The block processor adds convolutional coding and symbol interleaving to the M/H data to provide added robustness. The signal encoder adds fast information channel (FIC) and transmission parameter channel (TPC) control data, which is coded and interleaved for robustness. The group formatter and the packet formatter arrange the input for the interleaver so that the output is in the desired form. The output of these blocks is processed by the packet multiplexer which multiplexes M/H data and main service data.

The modified data randomizer is of the same legacy as the 8-VSB transmitter, except that it skips over the M/H data which was randomized in the M/H frame encoder. The systematic/non-systematic Reed-Solomon (RS) encoder optimizes location of parity bytes for M/H data while maintaining compatibility with legacy 8-VSB receivers. The data interleaver is the same as the legacy 8-VSB transmitter. The modified trellis encoder inserts M/H training signals to provide robustness and high Doppler conditions, but is otherwise the same as the legacy 8-VSB transmitter. The non-systematic Reed-Solomon encoder and the parity replacer recalculate certain Reed-Solomon parity bytes to replace those calculated prior to the trellis initialization.

The remaining functional components in the transmitter system are the same as the legacy 8-VSB transmitter system.

The processing performed on ATSC-M/H service data renders it in a form that cannot be processed by an ATSC-compliant receiver device. Thus, the data included in the ATSC-M/H service is not apparent or accessible to an ATSC receiver device.

The various embodiment methods and apparatus provide improved ATSC receiver device performance by utilizing the additional training sequences in the ATSC-M/H slot to facilitate the demodulation and decoding of the ATSC signal. Since the ATSC-M/H training symbols are longer than the ATSC Field Sync, the embodiments provide more synchronization information and CSI to the receiver device that can be used for refining symbol reception and decoding. By an ATSC receiver receiving training sequences from the ATSC-M/H slot, the number of symbols that can be used for reliable CSI estimation may increase to 1424 symbols, the contiguous training sequence length may increase to 1424 symbols, and the percentage of known/reliable symbols for training may increase by an additional 0.39%. Thus, the various embodiment methods and apparatus may provide a significant improvement in the ATSC receiver performance by enabling the device to more reliably determine delay spread, perform equalization, accomplish signal presence detection, accomplish channel detection, and accomplish timing and time tracking.

The various embodiment methods and apparatus may significantly improve CSI estimation and initial training by an ATSC receiver even if only one ATSC-M/H slot is available in the multiplexed signal. This is because even with one ATSC-M/H slot per ATSC-M/H superframe, the amount of total training symbols may be extended by 50% as compared to total training symbols available in the ATSC main service. If more ATSC-M/H slots per ATSC-M/H superframe are used by the broadcaster, the ratio of known/reliable symbols for training may increase significantly to the order of about 0.4% per each ATSC-M/H slot. For example, if eight ATSC-M/H slots are used by the broadcaster, the ratio of known/reliable symbols for training may be 3.12%, which is four times the total ATSC known/reliable symbol ratio.

In an embodiment, an ATSC receiver may be configured to receive and use ATSC-M/H training symbols by processing the received multiplexed signal using additional signal processing algorithms. An ATSC receiver device may be configured to receive and correlate ATSC-M/H training sequence 2 symbols ("TR2") which comprise a plurality of predefined symbols separated by 532 delay symbols (i.e., a delay of 532 symbols). The ATSC receiver may also be configured to more accurately estimate residual frequency error using the ATSC-M/H training symbols.

If the ATSC receiver device detects the ATSC-M/H TR2 sequence by symbol count, the ATSC receiver may be configured to identify the location of the ATSC-M/H TR1 in the transmission. The ATSC receiver device may also be configured to detect and correlate two consecutive ATSC-M/H TR1 sequences to perform fine residual frequency error estimation.

The received ATSC-M/H training sequences (i.e., TR1 and TR2 sequences) may also be used as training symbols for a Decision Feedback Equalizer (DFE) or DFE-like equalizers.

Most ATSC receiver devices use a two-step automatic frequency control (AFC) or frequency tracking. First, a coarse automatic frequency control may be canceled by using the training symbols transmitted as part of the ATSC main service transmission. Second, the ATSC receiver may perform fine automatic frequency control using the correlation between consecutive Field Sync symbols.

The coarse automatic frequency control is based on the phase-locked loop (PLL) on the training symbol or pilot that is a continuous wave (CW) signal at the edge of the ATSC transmission. A PLL circuit responds to both the frequency and the phase of the pilot symbol, automatically raising or lowering the frequency of the receiver device until it is matched to the pilot in both frequency and phase. The ATSC receiver may use analogue or digital techniques to perform frequency lock. However, the ATSC receivers have limited frequency lock capabilities which depend on the techniques used and required lock time. ATSC receivers are usually configured to achieve at least tune down to +/−20 Hz in one second (or less).

An ATSC receiver device performs fine automatic frequency control based on Field Sync tracking in which usually only the PN511 is used. As described above, the Field Sync has 511 symbols which repeat every 24.2 milliseconds. Thus, fine automatic frequency control is accomplished on 511 symbols out of a total of 260416 symbols. Using this method, an ATSC receiver may lock on with an initial frequency error up to +/−20 Hz. The tracking is challenging in reception circumstances in which the signal to noise ratio (SNR) is low and/or there are varying channels.

Fine automatic frequency control can be improved by making use of the additional training symbols in the ATSC-M/H service. Every ATSC-M/H slot can include a TR2 sequence that consists of two identical halves. Each half consists of 528 symbols that are separated by 532 symbols. Due to this small separation, correlation techniques can achieve frequency lock even at +/−80 KHz. This value corresponds to an error of 100 ppm (at upper UFH range). Thus, when using the ATSC-M/H TR2 sequences for such purposes, ATSC receiver devices may forego the ATSC coarse automatic frequency control method. Additionally, when using the ATSC-M/H TR2 sequence, ATSC receiver devices may achieve a frequency lock faster than when they use the ATSC coarse automatic frequency control method.

The ATSC-M/H service includes in every M/H slot 5 the TR1 sequence which contains 1424 identical symbols, spaced apart by 13312 symbols (measured from the start of one symbol to the start of the next symbol). An ATSC receiver device configured to use these ATSC-M/H TR1 sequences may achieve better automatic frequency control in the same or shorter time compared to conventional ATSC course automatic frequency control methods. The time separation of the ATSC-M/H TR1 sequence of symbols may allow AFC lock range up to +/−400 Hz, reducing the time required to accomplish course automatic frequency control.

Figure 6:
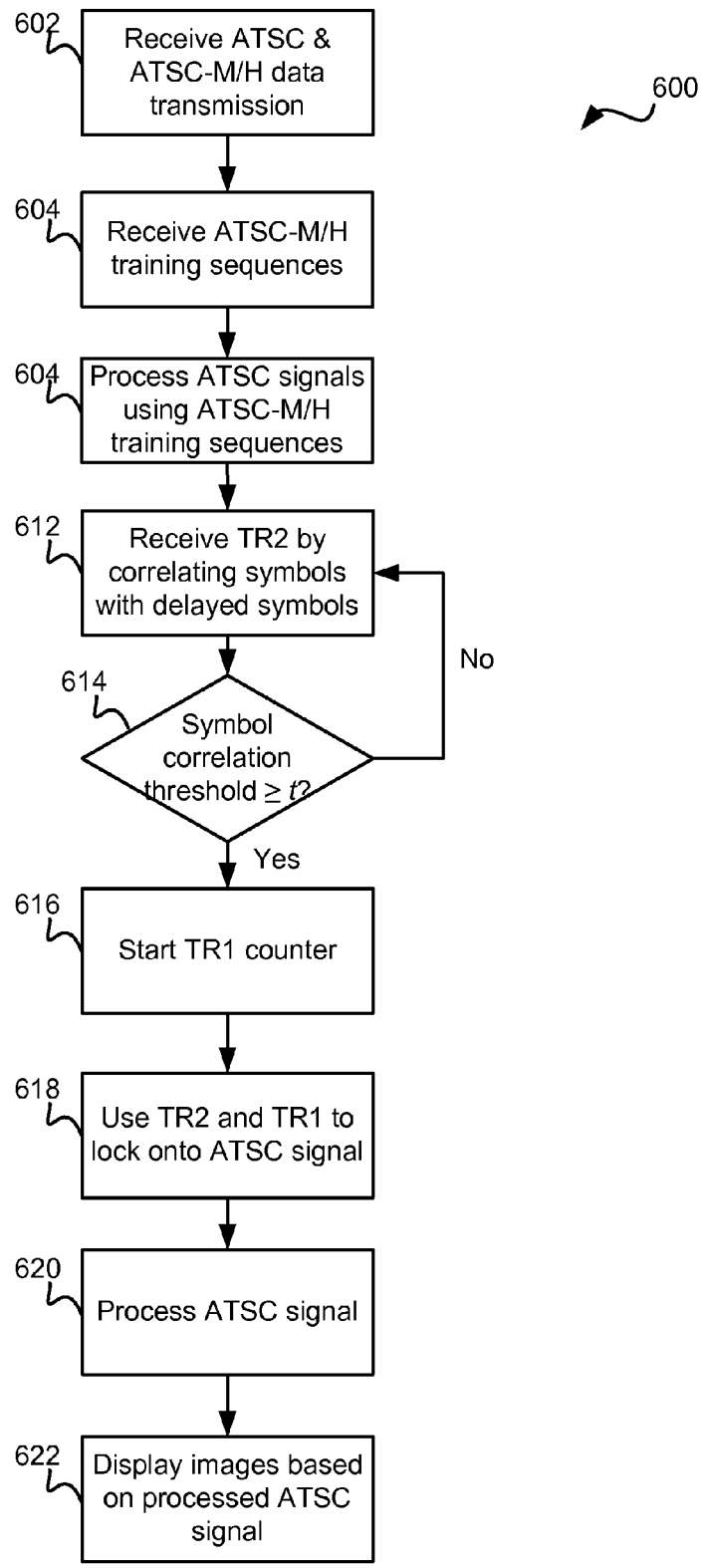
FIG. 6 is a process flow diagram of an embodiment method for receiving and processing ATSC-M/H training sequences by an ATSC receiver.

FIG. 6 illustrates an embodiment method 600 for receiving and processing ATSC-M/H training sequences in an ATSC receiver. An ATSC receiver may be configured to receive ATSC and ATSC-M/H signals, step 602, and receive the ATSC-M/H training sequences, step 604. The ATSC receiver may be configured to process the ATSC signals using the received the ATSC-M/H training sequences, step 606.

An ATSC receiver may be configured to receive the ATSC-M/H TR2 sequence and correlate the first half of the TR2 symbols with the delayed half of the TR2 sequence of symbols which may be received with a delay of 532 symbols, step 612. The ATSC receiver may be configured to determine whether the symbol correlation satisfies a threshold condition, such as the correlation equals or exceeds a predetermined threshold "t," determination step 614. This threshold condition may be selected at a value that enables reliable reception under a variety of conditions. If the symbol correlation satisfies the threshold condition (i.e., determination step 614="Yes"), the ATSC receiver may start a counter for the ATSC-M/H TR1 sequence of symbols. The ATSC receiver may use the TR1 and TR2 sequences to lock onto the ATSC signal, step 618. For example, the received TR1 and TR2 sequences may be used to estimate residual frequency error or as training symbols for DFEs. The received ATSC signals are then processed in accordance with the ATSC standard, step 620, and the processed ATSC signal used to display images to the user, step 622. If the ATSC receiver determines that the symbol correlation does not satisfy the threshold condition (i.e., determination 614="No"), the ATSC receiver may receive the next ATSC-M/H TR2 sequence and correlate the first half of the TR2 sequence of symbols with the second half after the 532 delayed symbols, returning to step 612.

In a further embodiment, an ATSC receiver device may use different TR1 sequences to perform fine residual frequency error estimation by computing the correlation between the two sequences and factoring it by the time separation.

Figure 7:
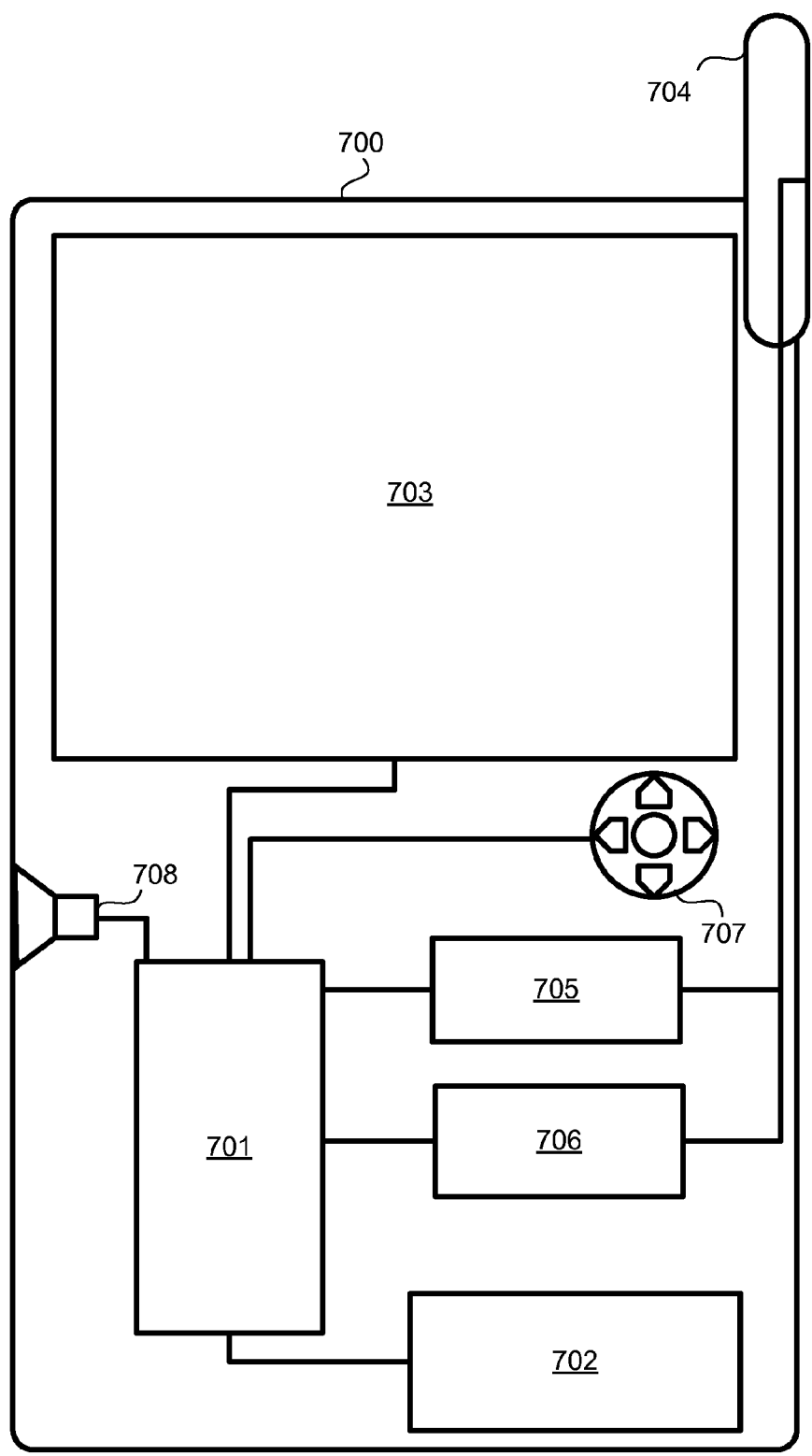
FIG. 7 is a component block diagram of an ATSC-M/H receiver device suitable for use with the various embodiments.

FIG. 7 is a system block diagram of a receiver device 700 suitable for receiving ATSC transmissions in accordance with any of the embodiments. A typical receiver device 700 may include a processor 701 coupled to internal memory 702, a display 703, and to a speaker 708. Additionally, the receiver device 700 will include an antenna 704 for sending and receiving electromagnetic radiation that may be connected to a wireless data link and/or cellular telephone transceiver 705 coupled to the processor 701 and an ATSC receiver 706 coupled to the processor 701. Receiver devices 700 typically also include menu selection buttons or rocker switches 707 for receiving user inputs.

Decoding of ATSC signals and ATSC-M/H training sequences using the various embodiments may be performed by the ATSC receiver 706 and portions of the processor 701, and memory 702. Alternatively dedicated modules within or coupled to the multimedia broadcast receiver 706 may perform the embodiment methods. In other alternative embodiments, the methods may be performed by the processor 701, after the ATSC signal and ATSC-M/H training sequences are received and demodulated by the ATSC receiver 706.

While FIG. 7 illustrates a mobile receiver device, fixed receiver devices, such as digital televisions, will include the same or similar components as those illustrated in FIG. 7. Thus, the example shown in FIG. 7 is not intended to limit the scope of the claims in any way to mobile receiver device.

The processors 701 may be any programmable microprocessor, microcomputer or multiple processor chip or chips that can be configured by software instructions (applications) to perform a variety of functions, including the functions of the various embodiments described below. In some mobile receiver devices, multiple processors 701 may be provided, such as one processor dedicated to wireless communication functions and one processor dedicated to running other applications. Typically, software applications may be stored in the internal memory 702 before they are accessed and loaded into the processor 701. The processor 701 may include internal memory sufficient to store the application software instructions.

A further embodiment may be in the form of an ATSC receiver integrated circuit ("chip") 706 that includes with in the chip a radio frequency receiver circuit coupled to a signal processor, such as a digital signal processor (DSP), configured with DSP-executable instructions to perform the operations of the method described above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible or non-transitory computer-readable storage medium. Computer-readable storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for improving signal demodulation in an Advanced Television Systems Committee (ATSC) receiver device, comprising:
   receiving a multiplexed ATSC signal including an ATSC service and at least one ATSC-Mobile/Handheld (ATSC-M/H) slot;
   obtaining an ATSC-M/H training sequence 2 (TR2) from the received multiplexed ATSC signal based on a symbol count during the at least one ATSC M/H slot;
   correlating symbols from two halves of the obtained TR2;
   determining whether a correlation of the symbols of the two halves of the obtained TR2 satisfies a threshold condition;
   starting a counter to obtain an ATSC-M/H training sequence 1 (TR1) when the correlation of the symbols of the two halves of the obtained TR2 satisfies the threshold condition; and
   locking onto the ATSC service using the obtained TR1 and the obtained TR2.

2. The method of claim 1, wherein locking onto the ATSC service using the obtained TR1 and the obtained TR2 comprises using the obtained TR1 and the obtained TR2 to estimate residual frequency error.

3. The method of claim 1, wherein locking onto the ATSC service using the obtained TR1 and the obtained TR2 comprises using the obtained TR1 and the obtained TR2 as training symbols for a decision-feedback equalizer.

4. The method of claim 1, wherein:
   obtaining the TR2 from the received multiplexed ATSC signal comprises obtaining two consecutive TR1 sequences based on the symbol count during the at least one ATSC-M/H slot; and
   locking onto the ATSC service using the obtained TR1 and the obtained TR2 comprises correlating the obtained two consecutive TR1 sequences to perform fine residual frequency error estimation.

5. The method of claim 1, wherein:
   obtaining the TR2 from the received multiplexed ATSC signal comprises obtaining and storing the TR2 based on the symbol count during the at least one ATSC-M/H slot; and
   locking onto the ATSC service using the obtained TR1 and the obtained TR2 comprises using symbols of the obtained TR2 to detect subsequent symbols of the TR2.

6. A receiver device configured to receive Advanced Television Systems Committee (ATSC), format transmissions, comprising:
   a processor; and
   a receiver circuit coupled to the processor and configured to receive ATSC transmissions, wherein the processor is configured with processor-executable instructions to perform operations comprising:
      receiving a multiplexed ATSC signal including an ATSC service and at least one ATSC-Mobile/Handheld (ATSC-M/H) slot;
      obtaining an ATSC-M/H training sequence 2 (TR2) from the received multiplexed ATSC signal based on a symbol count during the at least one ATSC M/H slot;
      correlating symbols from two halves of the obtained TR2;
      determining whether a correlation of the symbols of the two halves of the obtained TR2 satisfies a threshold condition;
      starting a counter to obtain an ATSC-M/H training sequence 1 (TR1) when the correlation of the symbols of the two halves of the obtained TR2 satisfies the threshold condition; and
      locking onto ATSC service using the obtained TR1 and the obtained TR2.

7. The receiver device of claim 6, wherein the processor is further configured with processor-executable instructions such that locking onto the ATSC service using the obtained TR1 and the obtained TR2 comprises using the obtained TR1 and the obtained TR2 to estimate residual frequency error.

8. The receiver device of claim 6, wherein the processor is further configured with processor-executable instructions such that locking onto the ATSC service using the obtained TR1 and the obtained TR2 comprises using the obtained TR1 and the obtained TR2 as training symbols for a decision-feedback equalizer.

9. The receiver device of claim 6, wherein the processor is configured with processor-executable instructions such that:
   obtaining the TR2 from the received multiplexed ATSC signal comprises obtaining two consecutive TR1 sequences based on the symbol count during the at least one ATSC-M/H slot; and
   locking onto the ATSC service using the obtained TR1 and the obtained TR2 comprises correlating the obtained two consecutive TR1 sequences to perform fine residual frequency error estimation.

10. The receiver device of claim 6, wherein the processor is further configured with processor-executable instructions such that:
  obtaining the TR2 from the received multiplexed ATSC signal comprises obtaining and storing the TR2 based on the symbol count during the at least one ATSC-M/H slot; and
  locking onto the ATSC service using the obtained TR1 and the obtained TR2 comprises using symbols of the obtained TR2 to detect subsequent symbols of the TR2.

11. A receiver device configured to receive Advanced Television Systems Committee (ATSC) format transmissions, comprising:
  means for receiving a multiplexed ATSC signal including an ATSC service and at least one ATSC-Mobile/Handheld (ATSC-M/H) slot;
  means for obtaining an ATSC-M/H training sequence 2 (TR2) from the received multiplexed ATSC signal based on a symbol count during the at least one ATSC M/H slot;
  means for correlating symbols from two halves of the obtained TR2;
  means for determining whether a correlation of the symbols of the two halves of the obtained TR2 satisfies a threshold condition;
  means for starting a counter to obtain an ATSC-M/H training sequence 1 (TR1) when the correlation of the symbols of the two halves of the obtained TR2 satisfies the threshold condition; and
  means for locking onto the ATSC service using the obtained TR1 and the obtained TR2.

12. The receiver device of claim 11, wherein the means for locking onto the ATSC service using the obtained TR1 and the obtained TR2 is configured to use the obtained TR1 and the obtained TR2 to estimate residual frequency error.

13. The receiver device of claim 11, wherein the means for locking onto the ATSC service using the obtained TR1 and the obtained TR2 training sequences is configured to use the obtained TR1 and the obtained TR2 as training symbols for a decision-feedback equalizer.

14. The receiver device of claim 11, wherein:
  the means for obtaining the TR2 from the received multiplexed ATSC signal is configured to obtain two consecutive TR1 sequences based on the symbol count during the at least one ATSC-M/H slot; and
  the means for locking onto the ATSC service using the obtained TR1 and the obtained TR2 is configured to correlate the obtained two consecutive TR1 sequences to perform fine residual frequency error estimation.

15. The receiver device of claim 11, wherein:
  the means for obtaining the TR2 from the received multiplexed ATSC signal is configured to obtain and store the TR2 based on the symbol count during the at least one ATSC-M/H slot; and
  the means for locking onto the ATSC service using the obtained TR1 and the obtained TR2 is configured to use symbols of the obtained TR2 to detect subsequent symbols of the TR2.

16. A non-transitory processor-readable storage medium having stored thereon processor-executable instructions configured to cause a processor of an Advanced Television Systems Committee (ATSC) receiver device to perform operations comprising:
  receiving a multiplexed ATSC signal including an ATSC service and at least one ATSC-Mobile/Handheld (ATSC-M/H) slot;
  obtaining an ATSC-M/H training sequence 2 (TR2) from the received multiplexed ATSC signal based on a symbol count during the at least one ATSC M/H;
  correlating symbols from two halves of the obtained TR2;
  determining whether a correlation of the symbols of the two halves of the obtained TR2 satisfies a threshold condition;
  starting a counter to obtain an ATSC-M/H training sequence 1 (TR1) when the correlation of the symbols of the two halves of the obtained TR2 satisfies the threshold condition; and
  locking onto the ATSC service using the obtained TR1 and the obtained TR2.

17. The non-transitory processor-readable storage medium of claim 16, wherein the stored processor-executable instructions are further configured such that locking onto the ATSC service using the obtained TR1 and the obtained TR2 comprises using the obtained TR1 and the obtained TR2 to estimate residual frequency error.

18. The non-transitory processor-readable storage medium of claim 16, wherein the stored processor-executable instructions are further configured such that locking onto the ATSC service using the obtained TR1 and the obtained TR2 comprises using the obtained TR1 and the obtained TR2 as training symbols for a decision-feedback equalizer.

19. The non-transitory processor-readable storage medium of claim 16, wherein the stored processor-executable instructions are further configured such that:
  obtaining the TR2 from the received multiplexed ATSC signal comprises obtaining two consecutive TR1 sequences based on the symbol count during the at least one ATSC-M/H slot; and
  locking onto the ATSC service using the obtained TR1 and the obtained TR2 comprises correlating the obtained two consecutive TR1 sequences to perform fine residual frequency error estimation.

20. The non-transitory processor-readable storage medium of claim 16, wherein the stored processor-executable instructions are further configured such that:
  obtaining the TR2 from the received multiplexed ATSC signal comprises obtaining and storing the TR2 based on the symbol count during the at least one ATSC-M/H slot; and
  locking onto the ATSC service using the obtained TR1 and the obtained TR2 comprises using symbols of the obtained TR2 to detect subsequent symbols of the TR2.

* * * * *